UNITED STATES PATENT OFFICE.

IGNAZ ROSENBERG, OF BIEBRICH, GERMANY, ASSIGNOR TO KALLE & CO., OF SAME PLACE.

BLACK POLYAZO DYE.

SPECIFICATION forming part of Letters Patent No. 613,645, dated November 1, 1898.

Application filed December 27, 1897. Serial No. 663,478. (Specimens.)

*To all whom it may concern:*

Be it known that I, IGNAZ ROSENBERG, doctor of philosophy, a subject of the Emperor of Austria-Hungary, residing at Biebrich-on-the-Rhine, Germany, and assignor to KALLE & Co., of same place, have invented a new and useful Improvement in the Manufacture of Polyazo Dyestuffs, of which the following is a specification.

In the United States Patent No. 588,182 a mixed substantive dyestuff is described, producible by combining equimolecular proportions of tetrazotized benzidin of the monoazo color formed by combining paranitrodiazo-benzene with 1.8.4.6 amidonaphtholdisulfo-acid (K) in acid solution and of 1.3.6 naphthalenediaminsulfo-acid. Now I have found that this coloring-matter is materially improved in its properties relating to solubility, tinctorial, and equalizing power if the nitro group contained in the molecule of this coloring-matter and originating from the nitrodiazo body employed is transformed by reduction into an amido group. The coloring-matter also gains by this operation a further diazotizable group. The reduction can be effected either in the finally-resulting coloring-matter or with greater advantage before the preparation of the intermediate product—namely, in the monoazo color. The most suitable reducing agent for this purpose is sodium sulfid.

In carrying out my invention I proceed, for instance, as follows: 13.8 kilos paranitranilin are dissolved in twenty-eight kilos concentrated hydrochloric acid and two hundred and fifty liters of water, cooled with two hundred kilos of ice, and diazotized with 6.9 kilos sodium nitrite. The so-obtained diazo solution is added to a cold solution of 34.1 kilos acid sodium salt of the 1.8.4.6 amidonaphtholdisulfo-acid (K) in one thousand liters of water. After five to eight hours the monoazo dye is completely formed and partly separated. I now heat up and add twenty-five kilos soda-ash. In this manner I obtain a clear-blue solution. To this solution I add thirty kilos crystallized sodium sulfid ($Na_2S$—$9aq$) and stir for about one and a half to two hours at a temperature of between 50° and 60° centigrade. The color of the solution changes from blue to reddish violet. At this stage the reduction of the nitro group is finished. The mass is now cooled to about 5° centigrade, and the tetrazo solution, prepared in the usual manner from 18.4 kilos benzidin, is added to it. The intermediate product is formed immediately and separates out as a greenish-black precipitate. Without loss of time I now add under stirring the cold solution of 24.3 kilos 1.3.6 naphthalenediaminsulfo-acid and four kilos caustic soda in five hundred liters of water. The precipitate now goes again into solution. After several hours the dyestuff is completely formed. I now heat up and precipitate the dyestuff by adding common salt. After pressing and drying it represents a powder which dissolves in water with a black and in concentrated sulfuric acid with an indigo-blue color. In alcohol it is insoluble. From the solution in concentrated sulfuric acid it is reprecipitated by addition of water as a violet precipitate. The aqueous solution is not altered by addition of caustic soda, while hydrochloric acid precipitates the free acid of the coloring-matter. The new product dyes cotton without mordant black and is remarkable for its easy solubility and its great tinctorial power. It can be diazotized on the fiber and combined with various developers. By replacing the amidonaphtholdisulfo-acid (K) by the isomer amidonaphtholdisulfo-acid (H) or by replacing the benzidin by another diamin the dyeing properties of the coloring-matter are not materially altered.

What I claim is—

1. The process of producing a new polyazo dyestuff by reducing in alkaline solution the nitro group of the monoazo color obtained from one molecule of paranitrodiazo-benzene and one molecule of 1.8.4.6 amidonaphtholdisulfo-acid (K) in acid solution, by combining the reduced product with one molecule of tetrazo-diphenyl to an intermediate body, and by acting upon this with one molecule of 1.3.6 naphthalenediaminsulfo-acid substantially as described.

2. The new product herein described producible by reducing in alkaline solution the nitro group of the monoazo color obtained from one molecule of paranitrodiazo-benzene and one molecule of 1.8.4.6 amidonaphtholdisulfo-acid (K) in acid solution, combining the reduced product with one molecule of tetrazodiphenol and acting upon this with one molecule of 1.3.6 naphthalenediaminsulfo-acid, which consists of a black powder soluble in water with black, in concentrated sulfuric acid with indigo-blue color, insoluble in alcohol, which is reprecipitated from its solution in concentrated sulfuric acid by addition of water as a violet precipitate, which dyes unmordanted cotton black in very full and even shades, and which can be rediazotized and combined with various developers.

In testimony whereof I have signed my name to this specification in the presence of two subscribing witnesses.

IGNAZ ROSENBERG.

Witnesses:
C. REINHARD,
JACOB ADRIAN.